United States Patent
Wagoner et al.

(10) Patent No.: US 10,141,744 B2
(45) Date of Patent: Nov. 27, 2018

(54) CABLE ARRANGEMENT OF AN ENERGY STORAGE SYSTEM

(71) Applicant: General Electric Company, Schenectady, NY (US)

(72) Inventors: Robert Gregory Wagoner, Roanoke, VA (US); Harold Robert Schnetzka, Simpsonville, SC (US); Wayne Allen Schulz, Binghamton, NY (US); Douglas Austin, Amsterdam, NY (US); Abiyu Negede, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 15/156,540

(22) Filed: May 17, 2016

(65) Prior Publication Data

US 2017/0338656 A1    Nov. 23, 2017

(51) Int. Cl.
  *H01B 7/30* (2006.01)
  *H01B 11/02* (2006.01)
  (Continued)

(52) U.S. Cl.
  CPC .............. *H02J 3/382* (2013.01); *H02J 3/383* (2013.01); *H02J 3/386* (2013.01); *H02J 3/387* (2013.01);
  (Continued)

(58) Field of Classification Search
  CPC .......... H02J 3/382; H02J 3/383; H02J 7/0052; H02J 3/387; H02J 3/386; H02M 5/40
  See application file for complete search history.

(56) References Cited

U.S. PATENT DOCUMENTS

| 7,579,702 B2* | 8/2009 | Park | H02J 3/386 290/44 |
| 2005/0061537 A1* | 3/2005 | Yumura | H01R 4/68 174/125.1 |

(Continued)

FOREIGN PATENT DOCUMENTS

JP    2013-187122 A    9/2013

OTHER PUBLICATIONS

Brozek, J. P., "DC overcurrent protection—Where we stand," IEEE Industry Applications Society Annual Meeting, pp. 1306-1310 (1992).

(Continued)

*Primary Examiner* — Alfonso Perez Borroto
*Assistant Examiner* — Esayas Yeshaw
(74) *Attorney, Agent, or Firm* — Dority & Manning, P.A.

(57) ABSTRACT

Systems and methods for regulating a short circuit current associated with an energy storage system are provided. In one embodiment, an energy storage system can include an energy storage device and a switching power supply coupled to the energy storage device. The energy storage system can further include one or more cables configured to couple the energy storage device to the switching power supply, and a magnetic framework positioned proximate the one or more cables. The magnetic framework can include one or more magnetic structures and can span at least a portion of the length of the cables. The one or more cables are positioned in a physical arrangement that, in conjunction with the magnetic framework, facilitates a selected inductance between the cables.

18 Claims, 4 Drawing Sheets

(51) Int. Cl.
    H02B 1/20      (2006.01)
    H02G 5/06      (2006.01)
    H02J 3/38      (2006.01)
    H02J 7/00      (2006.01)
    H02M 5/40      (2006.01)
    H02M 1/32      (2007.01)
    H02M 1/00      (2006.01)
(52) U.S. Cl.
    CPC ............. *H02J 7/0052* (2013.01); *H02M 1/32*
        (2013.01); *H02M 5/40* (2013.01); *H02M*
        *2001/0064* (2013.01)

(56) References Cited

U.S. PATENT DOCUMENTS

2010/0152049 A1* 6/2010 Soika .................. H01B 12/02
                                                    505/163
2012/0161518 A1* 6/2012 Schroeder ................ H02J 3/36
                                                    307/36
2015/0263569 A1* 9/2015 Brogan .................... H02J 3/36
                                                    290/44
2017/0373625 A1* 12/2017 Andersen ............... H02P 9/006

OTHER PUBLICATIONS

Cline, H. C., "Fuse Protection of DC Systems," Proceedings of the American Power Conference, pp. 1-6 (Sep. 1, 1995).

Coombes, C. D., "Techniques Used to Protect a DC System with More than 100kA Short Circuit Current Capacity," IEEE International Telecommunications Energy Conference (INTELEC), pp. 1-3 (2014).

Mollet, R., et al., "Understanding Short Circuit Currents in DC Power Systems When Used in Conjunction With Standby Batteries," IEEE International Telecommunications Energy Conference (INTELEC), pp. 27-33 (2002).

International Search Report and Written Opinion issued in connection with corresponding PCT Application No. PCT/US2017/032778 dated Nov. 21, 2017.

* cited by examiner

CABLE ARRANGEMENT OF AN ENERGY STORAGE SYSTEM

FIELD OF THE INVENTION

The present subject matter relates generally energy storage systems, and more particularly to cable arrangements of an energy storage system.

BACKGROUND OF THE INVENTION

Energy storage systems (e.g., battery energy storage systems) have become increasingly used to deliver power either as part of standalone energy storage systems or as part of power generation systems (e.g., a wind farm, solar farm, gas turbine system) with an integrated energy storage system. Energy storage systems are unique in that energy storage systems have the ability to both deliver and reserve energy for particular services. Energy storage systems can include one or more battery banks that can be coupled to the grid or other load via a suitable power converter.

Renewable energy power systems, such as wind energy power systems and solar energy power systems, often include a power converter with a regulated DC bus. For example, wind power systems, such as wind driven doubly-fed induction generator (DFIG) systems or full power conversion systems, can include a power converter with an AC-DC-AC topology. Solar power systems can include a power converter that has a DC-DC-AC topology.

An energy storage system can be coupled to the DC bus of a power converter in a renewable energy system. The energy storage system can be used, for instance, to apply power to the DC bus of the power converter during transient conditions. A switching power supply can be provided to transfer energy back and forth between the DC bus of the power converter and the energy storage device. For instance, the switching power supply can include a DC to DC converter configured to convert a first voltage on the DC bus to a second voltage at the energy storage device, and vice versa.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to an energy storage system. The energy storage system includes an energy storage device and a switching power supply coupled to the energy storage device. The energy storage system further includes one or more cables configured to couple the energy storage device to the switching power supply. The energy storage system further includes a magnetic framework positioned proximate the one or more cables. The magnetic framework includes one or more magnetic structures. The magnetic framework spans at least a portion of a length of the one or more cables. The one or more cables are positioned in a physical arrangement that, in conjunction with the magnetic framework, facilitates a selected inductance between the cables.

Another example aspect of the present disclosure is directed to a renewable energy power system. The renewable energy storage system includes a power converter system having a DC bus, and an energy storage system coupled to the DC bus of the power converter. The energy storage system includes an energy storage device and a switching power supply coupled between the energy storage device and the DC bus of the power converter. The renewable energy power system further includes one or more cables configured to couple the energy storage device to the switching power supply. The renewable energy storage system further includes a magnetic framework positioned proximate the one or more cables. The magnetic framework includes one or more magnetic structures. The magnetic framework spans at least a portion of the one or more cables. The one or more cables are positioned in a physical arrangement that, in conjunction with the magnetic framework, facilitates a selected inductance between the cables.

Yet another example aspect of the present disclosure is directed to a method of regulating a current associated with an energy storage device. The method includes identifying a selected inductance based at least in part on a short circuit current of an energy storage device associated with an energy storage system. The method further includes determining a physical arrangement of one or more cable groupings associated with the energy storage system based at least in part on the selected inductance. The method further includes determining a magnetic framework configuration to be positioned proximate the one or more cable groupings based at least in part on the selected inductance.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to an energy storage system configured to regulate a peak short circuit current of an energy storage device during a short circuit event. For instance, an energy storage system can be a standalone energy storage system or can be coupled, for instance, to a DC bus of a power converter associated with a renewable energy power system. The energy storage system can include one or more energy storage devices, such as one or more battery devices. In some implementations, a switching power supply can be coupled between the energy storage device(s) and a power converter. For instance, in implementations wherein the energy storage system is coupled to a renewable energy power system, the switching supply can be coupled between the energy storage device(s) and the DC bus of the power converter of the renewable energy power system. The energy storage device(s) can be coupled to the switching power supply by one or more cables. A magnetic framework may be positioned proximate the one or more cables. The magnetic framework can include one or more magnetic structures positioned in various manners with respect to the one or more cables. The one or more cables can further be positioned in a physical arrangement that, in conjunction with the magnetic framework, facilitates a selected inductance between the one or more cables.

As indicated, in one embodiment, the energy storage system can be coupled to a DC bus of an AC to DC to AC converter used in a wind energy power system. As another example, the energy storage system can be coupled to a DC bus of a DC to DC to AC converter used in a standalone energy storage system. The energy storage system can include an energy storage device, such as a battery storage device, fuel cell, capacitor, or other suitable energy storage device. A switching power supply can be coupled between the energy storage device and the DC bus of the power converter. A control system can control the switching power supply to regulate power flow between the energy storage device and the DC bus. For instance, the switching power supply can be controlled to convert a first DC voltage at the DC bus to a second DC voltage at the battery energy storage device.

The energy storage system can be coupled to the switching power supply or the power converter with one or more positive cables, one or more negative cables, and/or one or more ground cables. In some implementations, such cables can couple the energy storage device to the switching power supply, and can couple the switching power supply to the DC bus of the converter. The positive cables can be grouped in a positive cable grouping, the negative cables can be grouped in a negative cable grouping, and the ground cables can be grouped in a ground cable grouping. Each cable grouping can be housed in a plastic conduit substantially spanning the length of the cable grouping.

According to example embodiments of the present disclosure, the cable groupings can be positioned in a physical arrangement to facilitate a selected inductance between the cables. For instance, the physical arrangement can include a layout or configuration of the cable groupings. In some implementations, the physical arrangement can be a parallel arrangement, such that each cable grouping is positioned in a substantially parallel manner with respect to each other. In some implementations, the physical arrangement can include an arrangement of the cable groupings wherein the ground cable grouping is positioned between the positive cable grouping and the negative cable grouping. In some implementations, the physical arrangement can include a physical spacing between the cable groupings. For instance, the physical spacing can be a spacing of between about 3 inches and about 8 inches between each cable grouping. As used herein, the term "about," when used in conjunction with a numerical reference is intended to refer to within about 40% of the numerical reference.

In some implementations, a magnetic framework can be positioned proximate the cable groupings. The magnetic framework can include one or more magnetic structures that are positioned with respect to the cable groupings. The magnetic structures can be any suitable magnetic structure, such as a steel structure, iron structure, nickel structure, cobalt structure, or any other suitable magnetic structure. In some implementations, a magnetic structure can be a steel I-beam structure, a steel C-channel structure, or other suitable structure. The magnetic structures of the magnetic framework can be positioned proximate the cable groupings. In particular, the magnetic structures of the magnetic framework can be positioned a sufficient distance from the cable groupings to influence the inductance between the cable groupings in a desired manner in accordance with example embodiments of the present disclosure. For instance, in various implementations the magnetic structures may be positioned between about 0.1 inches and about 10 inches from the cable groupings. For instance a magnetic structure can be positioned between two cable groupings. As another example, a magnetic structure can be positioned to bracket or substantially surround one or more cable groupings. As yet another example, one or more magnetic structures can be positioned to surround or otherwise enclose one or more cable groupings. In some implementations, a magnetic structure can be positioned adjacent to a single side of a cable grouping. The magnetic structures can span at least a portion of the length of a cable grouping.

As indicated, the physical arrangement and/or the magnetic framework can be configured to facilitate a selected inductance between the cables. The selected inductance can be a desired inductance determined based at least in part on the short circuit current. For instance, the selected inductance can be an inductance capable of suitably limiting a peak short circuit current associated with the energy storage device during a short circuit event associated with the energy storage system. As will be understood by those skilled in the art, inductance can provide impedance to a change in current. In this manner, the selected inductance can be an inductance capable of reducing the peak short circuit current to a level that is acceptable to the system. The peak short circuit current can be determined at least in part by a bus voltage, an inductance, and a reaction time of a current limiting element (e.g. circuit breaker, fuse, etc.).

As indicated, the inductance between the cables can vary with the physical arrangement of the cables. For instance, the inductance can vary with the spacing between the cables. In addition, the magnetic framework can be configured to manipulate and/or shape the magnetic fields associated with current flow within the cables to further facilitate the selected inductance. Facilitating a selected inductance according to example aspects of the present disclosure can eliminate a need for an inductor device, such as an iron core inductor to be implemented in the system to limit such short circuit current. Such inductor device can add significant cost and complexity to the system design, due at least in part to the added space required by the inductor device, added packaging requirements, and/or added labor for additional wire termination.

Figure 1:
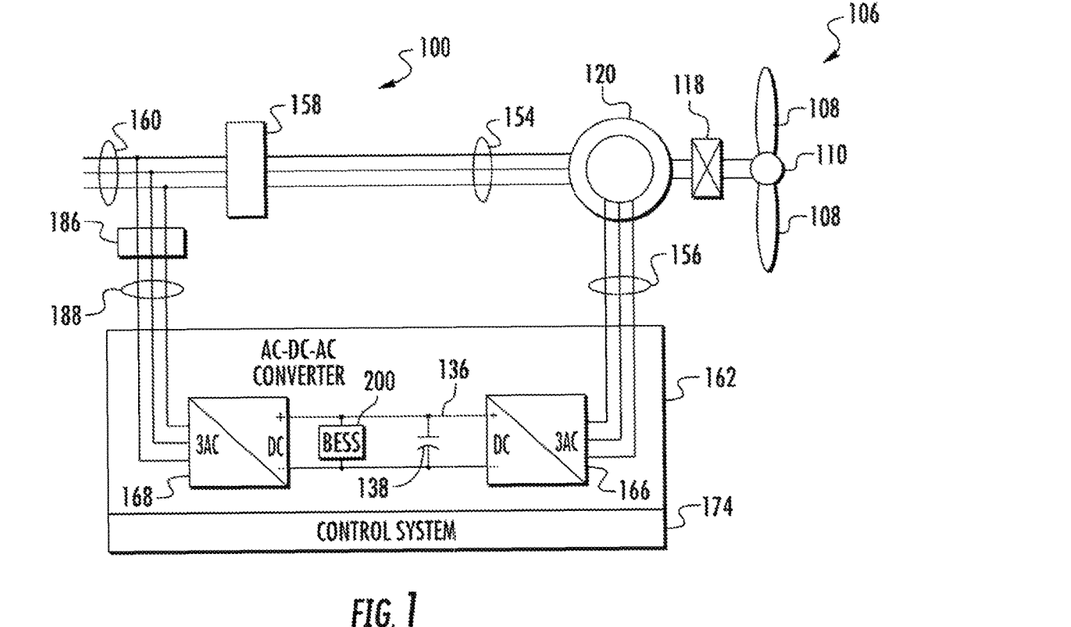
FIG. 1 depicts an example renewable energy power system according to example embodiments of the present disclosure.

With reference now to the figures, example embodiments of the preset disclosure will be discussed in greater detail. For instance, FIG. 1 depicts an example wind driven doubly-fed induction generator (DFIG) system 100. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other energy storage systems or power systems, such as a wind, solar, gas turbine, or other suitable power generation system.

In the example system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) switching elements. The rotor side converter 166 and the line side converter 168 can be coupled via a DC bus 136 across which is the DC bus capacitor 138.

The power converter 162 can be coupled to a control system 174 to control the operation of the rotor side converter 166 and the line side converter 168 and other aspects of the power system 100. The control system 174 can include any number of control devices. In one implementation, the control system 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and in other aspects of the power system 100, such as a power switching supply used in an energy storage system 200.

In operation, alternating current power generated at DFIG 120 by rotation of the rotor 106 is provided via a dual path to electrical grid 160. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC bus 136. Switching elements (e.g. IGBTs) used in bridge circuits of the rotor side power converter 166 can be modulated to convert the AC power provided from the rotor bus 156 into DC power suitable for the DC bus 136.

The line side converter 168 converts the DC power on the DC bus 136 into AC output power suitable for the electrical grid 160. In particular, switching elements (e.g. IGBTs) used in bridge circuits of the line side power converter 168 can be modulated to convert the DC power on the DC bus 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to example aspects of the present disclosure, a battery energy storage system 200 can be coupled to the power converter 162 of the power system 100. The present disclosure is discussed with reference to a battery energy storage system for purposes of illustration and discussion. Those of ordinary skill in the art, using the disclosures provided herein, should understand that aspects of the present disclosure are also applicable in other energy storage systems.

The battery energy storage system 200 can be coupled to the DC bus 136 of the power converter 162. The energy storage system 200 can be used to provide power to the DC bus 136 under certain conditions. For instance, the energy storage system 200 can be used to provide power to the DC bus 136 to increase output of the power system 100 when wind speed drops. Power can also be supplied to and stored in the energy storage system 200 during operation of the DFIG system 100.

Figure 2:
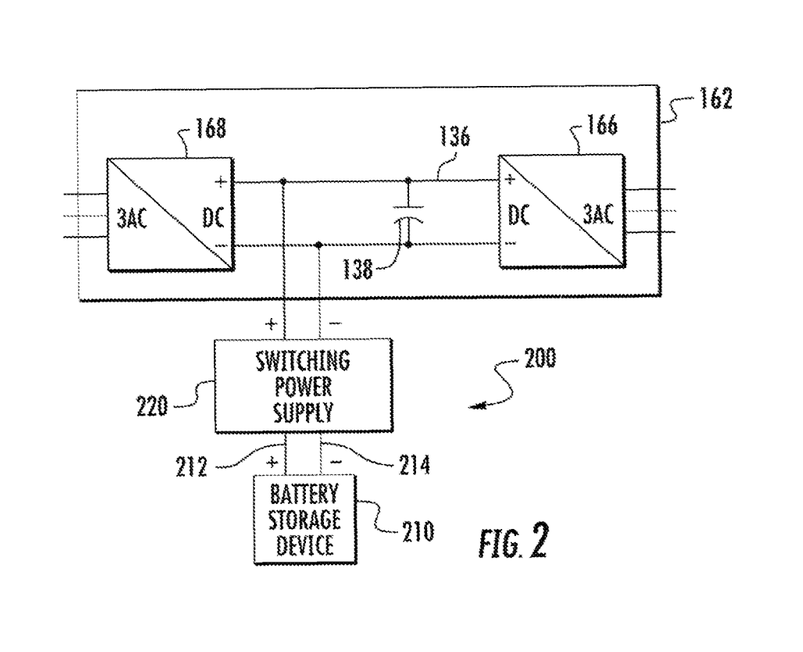
FIG. 2 depicts an example energy storage system according to example embodiments of the present disclosure.

FIG. 2 depicts an example battery energy storage system 200 coupled to the DC bus 136 of a power converter 162. The battery energy storage system 200 can include a battery energy storage device 210. The battery energy storage device 210 can be coupled to the DC bus 136 via a switching power supply 220, such as a DC to DC converter. The switching power supply 220 can convert the DC power on the DC bus to a DC voltage that is suitable for application to the battery energy storage device 210.

The switching power supply 220 can include a plurality switching elements (e.g. IGBTs or other switching elements). The switching elements can be controlled, for instance, by control system 174 (FIG. 1) to regulate power flow in the energy storage system 200. For example, during times of high power output, a first switching element can be controlled such that power flows in a first direction from the DC bus 136 to the energy storage device 210 to charge the energy storage device 210. During times of low power output, a second switching element can be controlled such that power flows in a second direction from the energy storage device 210 to the DC bus 136 for use in boosting output of the power system.

System 200 further includes positive cables 212 and negative cables 214 coupling battery storage device 210 to the switching power supply 220. In particular, positive cables 212 can couple the battery storage device 210 to a positive terminal of the switching power supply 220, and negative cables 214 can couple the battery storage device 210 to a negative terminal of the switching power supply 220. Positive cables 212 and/or negative cables 214 may include one or more cables or wires housed in a plastic conduit. In some implementations, system 200 can further include ground cables coupling the battery storage device 210 to a common reference point.

According to example aspects of the present disclosure, positive cables 212 and negative cables 214 can be arranged to substantially achieve a selected inductance between the cables. For instance, during a short circuit event, the short circuit current of the battery storage device 210 can cause damage to the energy storage system 200 and/or the wind turbine system 100. The selected inductance associated with cables 212, 214 can be determined to limit a peak short circuit current of the battery storage device 210, such that the short circuit current will not damage the system. As indicated, the physical spacing between positive cables 212 and negative cables 214 can affect the inductance between the cables. In this manner, the spacing between the cables can be determined based at least in part on the selected inductance. In some implementations, a magnetic framework can further be positioned proximate the cables 212, 214. The magnetic framework can include one or more magnetic structures that span at least a portion of the length of positive cables 212 and/or negative cables 214. The magnetic framework can further affect the inductance between positive cables 212 and negative cables 214. In this manner, the configuration and/or placement of the magnetic framework can be determined based at least in part on the selected inductance.

Figure 3:
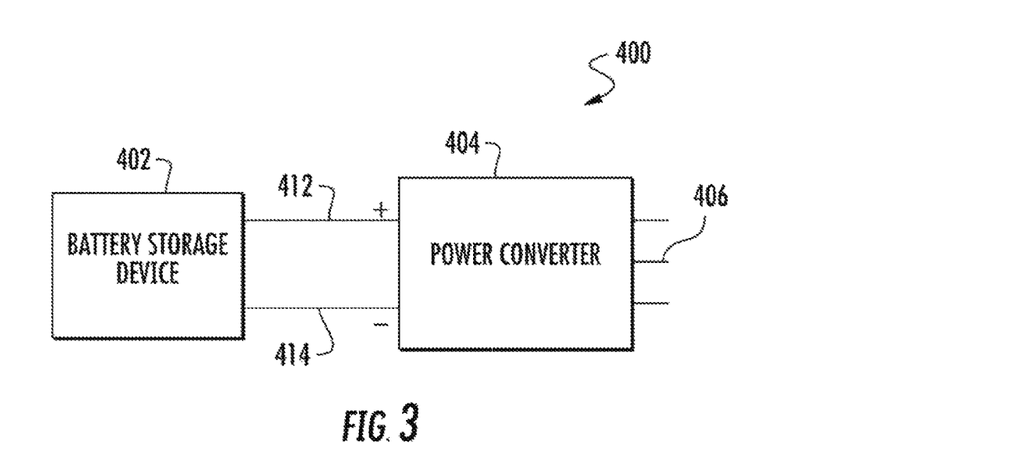
FIG. 3 depicts an example energy storage system according to example embodiments of the present disclosure.

As indicated above, in some implementations, energy storage systems of the present disclosure can be standalone energy storage systems configured, for instance, to deliver power to a grid. For instance, FIG. 3 depicts an overview of an example standalone energy storage system 400 according to example embodiments of the present disclosure. As shown, energy storage system 400 includes a battery storage device 402 coupled directly to a power converter 404. Power converter 404 can be configured to convert power provided from battery storage device 402 to an alternating current power suitable to supply to an AC grid 406 (e.g. 50 Hz or 60 Hz power). As with system 200 in FIG. 2, system 400 can include positive cables 412 and negative cables 414 configured to couple battery storage device 402 to power converter 404. System 400 can further include one or more ground cables configured to couple system 400 to a common reference. In this manner, positive cables 412, negative cables 414, and/or the ground cables can be arranged to substantially achieve a selected inductance between the cables to limit a peak short circuit current of battery storage device 402 in accordance with example embodiments of the present disclosure.

Figure 4:
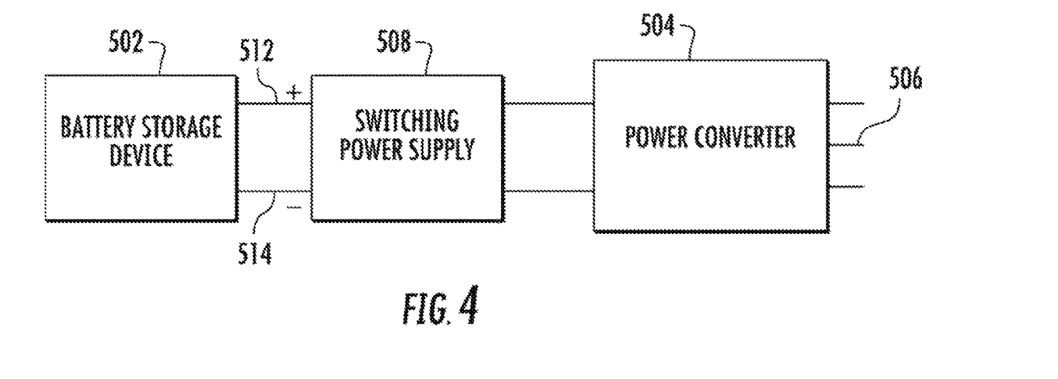
FIG. 4 depicts an example energy storage system according to example embodiments of the present disclosure.

FIG. 4 depicts an example standalone energy storage system 500 according to example embodiments of the present disclosure. As shown, system 500 includes a battery storage device 502 and a power converter 504 configured to provide a suitable power to an AC grid 506. System 500 further includes a switching power supply 508 coupled between battery storage device 502 and power converter 504. System 500 further includes positive cables 512 and negative cables 514 coupling battery storage device 502 to power switching supply 508. System 500 can further include one or more ground cables coupling system 500 to a common reference. As indicated above with respect to system 200 and system 400, positive cables 512, negative cables 514 and/or the ground cables can be arranged to substantially achieve a selected inductance between the cables to limit a peak short circuit current of battery storage device 502 in accordance with example embodiments of the present disclosure.

It will be appreciated that example systems 200, 400, and 500 are discussed for illustrative purposes only. It will further be appreciated that various other suitable energy storage system configurations can be used without deviating from the scope of the present disclosure. For instance, example energy storage systems of the present disclosure may include various suitable energy storage devices, wiring configurations, power converters, power supplies, and/or other suitable components.

Figure 5:
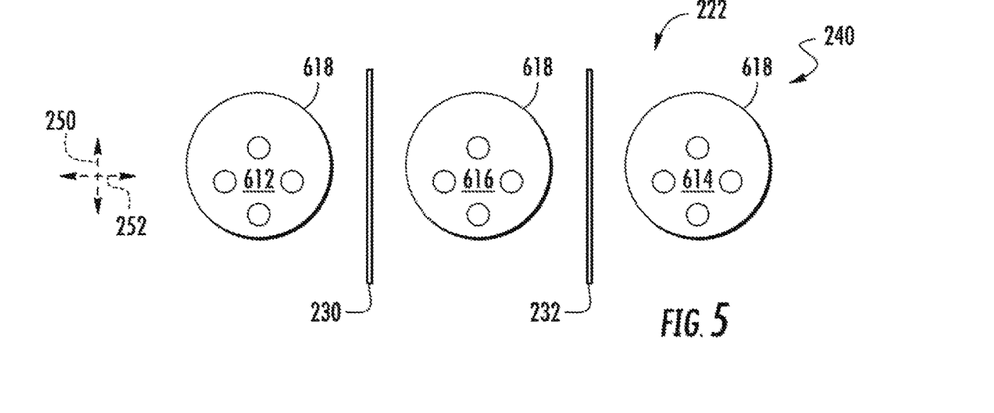
FIGS. 5-7 depicts example cable and magnetic framework configurations according to example embodiments of the present disclosure.
Figure 6:
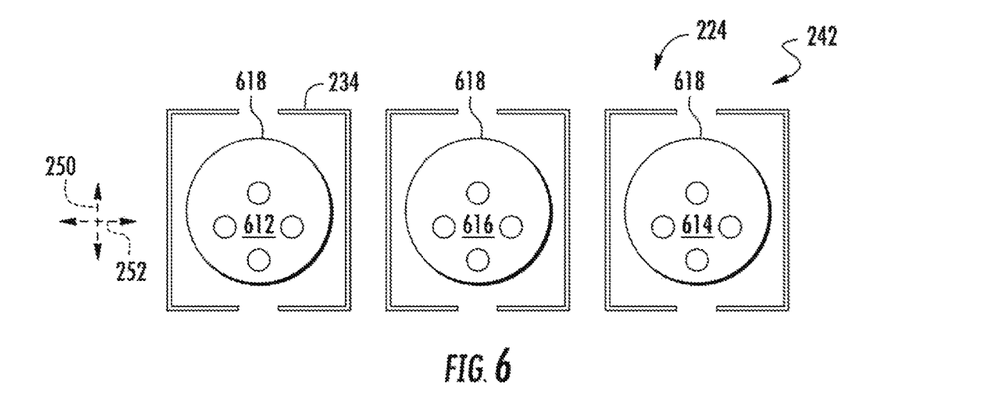
Figure 7:
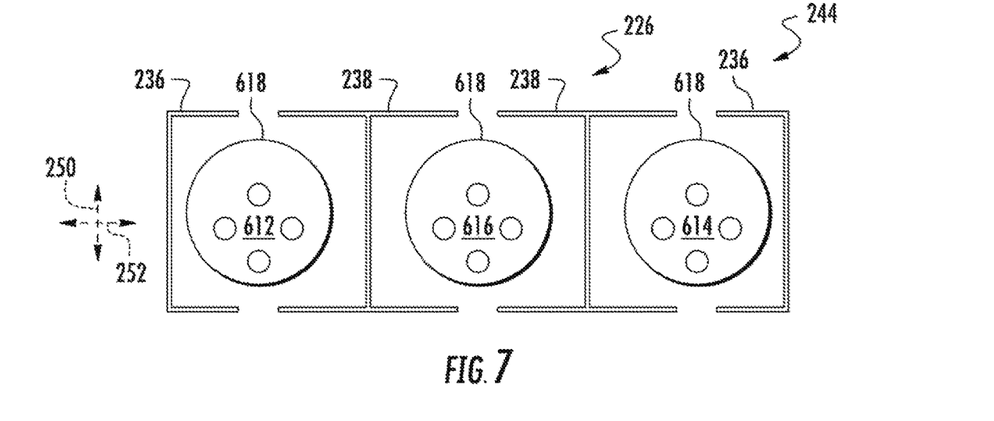

FIGS. 5-7 depict example cable and magnetic framework configurations according to example embodiments of the present disclosure. It will be appreciated that the example configurations depicted in FIGS. 5-7 are for illustrative purposes only, and that various other suitable configurations can be used without deviating from the scope of the present disclosure.

In particular, FIG. 5 depicts an example configuration 240. Configuration 240 depicts a cross section of positive cables 612 and negative cables 614, which are positioned to the right of positive cables 612. Configuration 240 further depicts a cross section of ground cables 616, which are positioned between positive cables 612 and negative cables 614. In various implementations, positive cables 612, negative cables 614, and/or ground cables 616 can be positioned substantially along a common plane. For instance, as shown, the cables are positioned substantially along a common axis 252. It will be appreciated that, in some implementations, the cables can be positioned along multiple planes. Positive cables 612, negative cables 614, and/or ground cables 616 can include any suitable number of cables or wires having various suitable gauges or sizes. Each cable grouping is housed in a plastic conduit 618 substantially spanning the length of the respective cables. Conduits 618 can be any suitable size. For instance, in some implementations, conduits 618 can have a radius of between about 0.5 inches and about 1 inch. In various implementations, cables 612-616 can have a physical arrangement including a physical spacing between the cable of between about 3 inches and about 10 inches. In some implementations, the spacing can be a center-to-center spacing with respect to conduits 618. As indicated, the spacing can be determined based at least in part on a selected inductance.

Configuration 240 can further include a magnetic framework 222 positioned proximate cables 612-616. Framework 222 includes magnetic structures 230 and 232. As shown, magnetic structure 230 is positioned between positive cables 612 and ground cables 616, and magnetic structure 232 is positioned between ground cables 616 and negative cables 614. As shown, magnetic structures 230, 232 form a straight line with respect to a common axis 250 of the cross section of cables 612-616. Magnetic structures 230, 232 can be any suitable magnetic material. Magnetic structures 230, 232 can span at least a portion of the length of cables 612-616.

FIG. 6 depicts an example cable configuration 242. Configuration 242 includes cables 612-616 housed in conduits 618, and a magnetic framework 224 positioned proximate cables 612-616. As shown, magnetic framework 224 contains a plurality of C-shaped magnetic structures 234 positioned to form brackets around cables 612-616. For instance, one or more magnetic structures 234 can be steel C-channel structures.

FIG. 7 depicts an example cable configuration 244. Configuration 244 includes cables 612-616 housed in conduits 618, and a magnetic framework 226 positioned proximate cables 612-616. Magnetic framework 226 includes two C-shaped structures 236 positioned as outer brackets of positive cables 612 and negative cables 614. Magnetic framework 226 further includes two I-shaped magnetic structures 238. For instance, magnetic structures 238 can be steel I-beam structures. In particular, magnetic framework 226 includes an I-shaped structure 238 coupled between positive cables 612 and ground cables 616, and an I-shaped structure coupled between ground cables 616 and negative cables 614.

It will be appreciated that the scope of the present disclosure is not limited to the cable and/or magnetic framework configurations depicted in FIGS. 5-7. For instance, various cable arrangements having various other cable numbers or spacings can be used without deviating from the scope of the present disclosure. As another example, various other magnetic frameworks having various other magnetic structures can also be used without deviating from the scope of the present disclosure. For instance, magnetic structures of various suitable shapes, materials, configurations, and/or alignments can be used.

Figure 8:
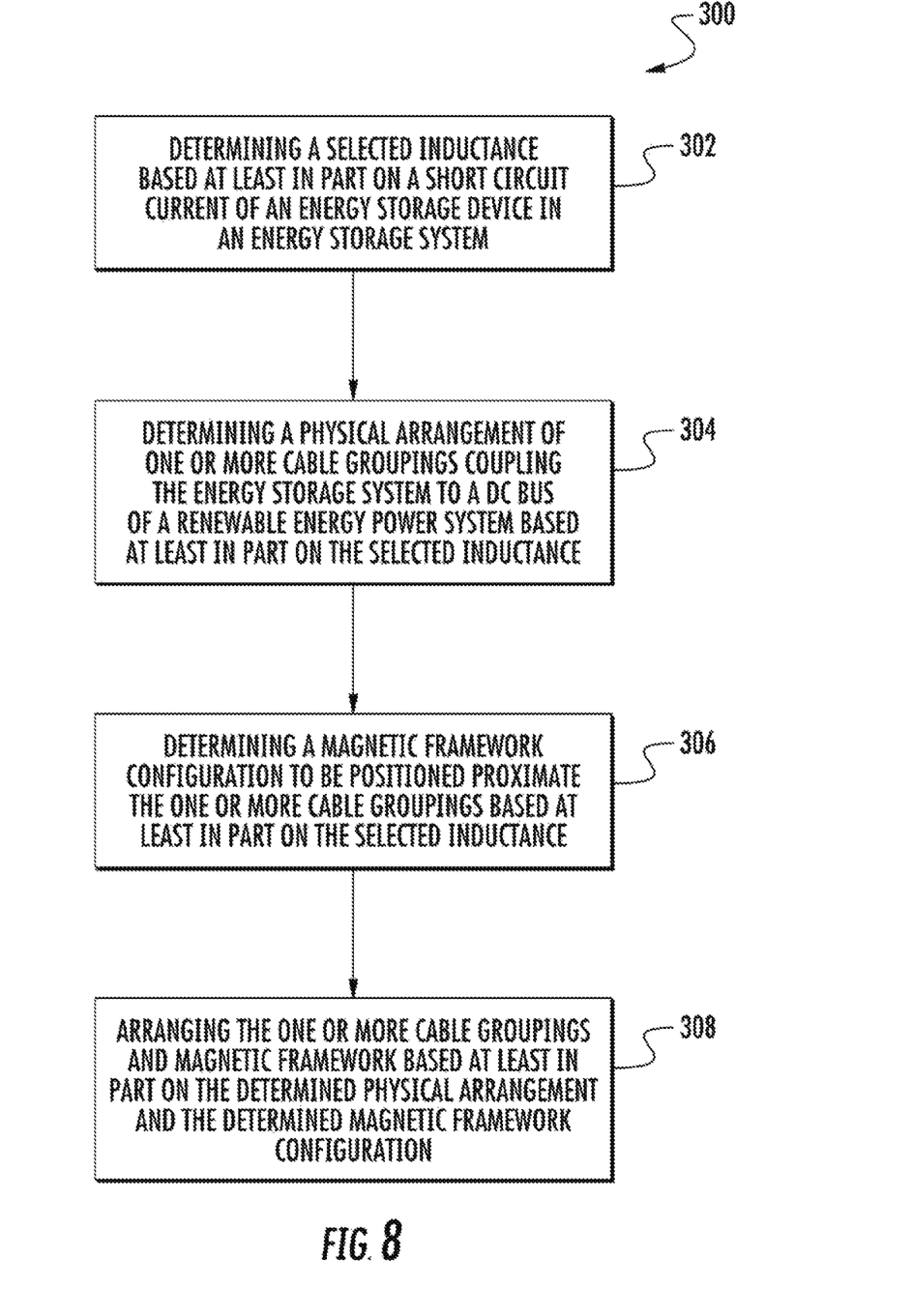
FIG. 8 depicts a flow diagram of an example method of regulating a current of an energy storage device according to example embodiments of the present disclosure.

FIG. 8 depicts a flow diagram of an example method (300) of limiting a short circuit current of an energy storage system associated with a renewable energy power system. FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include determining a selected inductance associated with a cable arrangement of an energy storage system based at least in part on a short circuit current of one or more energy storage devices in the energy storage system. As indicated, in some implementations, the energy storage system can be a standalone energy storage system, or the energy storage system can be coupled to a DC bus of a power converter of a renewable energy power system. In some implementations, the energy storage device(s) of the energy storage system can be coupled to a switching power supply. The selected inductance can be determined to limit the short circuit current of the energy storage device(s) to an acceptable level with respect to the energy storage system and/or the renewable energy power system. In some implementations, the selected inductance can be determined based at least in part on an interruption time of one or more current limiting devices (e.g. circuit breakers, fuses, etc.) associated with the energy storage system and/or the renewable energy power system. The selected inductance can further be determined based at least in part on a current withstand rating of the energy storage system and/or the renewable energy power system.

At (304), method (300) can include determining a physical arrangement of one or more cable groupings of the energy storage system based at least in part on the selected inductance. In particular, the one or more cable groupings can include a positive cable grouping and a negative cable grouping. As indicated above, in some implementations, the cable groupings can be configured to couple the energy storage device(s) to the switching power supply. In some implementations, the cable groupings can be configured to couple the energy storage device(s) to a power converter. The one or more cable groupings can further include a ground cable grouping coupling the energy storage system to a common ground. The physical arrangement can include a parallel arrangement wherein the cable groupings are positioned substantially parallel to each other. In some implementations, the physical arrangement can include an arrangement wherein the ground cable grouping is positioned between the positive and negative cable groupings. In some implementations, the physical arrangement can include a physical spacing between cable groupings of between about 3 inches and about 10 inches.

At (306), method (300) can include determining a magnetic framework configuration to be positioned proximate the one or more cable groupings based at least in part on the selected inductance. As indicated, the magnetic framework can include one or more magnetic structures positioned with respect to the cable groupings. The magnetic structures can be any suitable size and shape. The magnetic structures can be any suitable material, such as any suitable magnetic material. In addition, the magnetic structures can be positioned in various suitable locations relative to the cable groupings. In this manner, the size, shape, material, alignment, positioning, and/or configuration of the magnetic structures can be determined based at least in part on the selected inductance.

At (308), method (300) can include arranging the one or more cable groupings and the magnetic framework based at least in part on the determined physical arrangement and the determined magnetic framework configuration. The cables and the magnetic framework can be positioned to substantially achieve the selected inductance and/or the selected short circuit current of the energy storage device(s). In this manner, the physical arrangement of the cable groupings, in conjunction with the magnetic framework, can facilitate the selected inductance.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy storage system comprising:
an energy storage device;
a switching power supply coupled to the energy storage device;
one or more cables configured to couple the energy storage device to the switching power supply; and
a magnetic framework positioned proximate the one or more cables, the magnetic framework comprising one or more magnetic structures, the magnetic framework spanning at least a portion of a length of the one or more cables;
wherein the one or more cables are positioned in a physical arrangement that, in conjunction with the magnetic framework, facilitates a selected inductance between the cables; and
wherein the one or more cables comprise a positive cable grouping, a negative cable grouping, and a ground cable grouping, and wherein the ground cable grouping is positioned between the positive cable grouping and the negative cable grouping in a substantially parallel manner with respect to the positive cable grouping and the negative cable grouping, and wherein the magnetic framework is positioned such that at least two magnetic structures substantially surround at least one cable grouping.

2. The energy storage system of claim 1, wherein the physical arrangement of the one or more cables comprises a parallel arrangement, such that the positive cable grouping is positioned in a substantially parallel manner with respect to the negative cable grouping.

3. The energy storage system of claim 1, wherein each cable grouping is housed in a separate plastic conduit.

4. The energy storage system of claim 2, wherein the magnetic framework is positioned such that at least one magnetic structure is positioned between the positive cable grouping and the negative cable grouping.

5. The energy storage system of claim 1, wherein the magnetic framework is positioned such that at least one magnetic structure is positioned between the positive cable grouping and the ground cable grouping, and at least one magnetic structure is positioned between the ground cable grouping and the negative cable grouping.

6. The energy storage system of claim 1, wherein the physical arrangement of the one or more cables comprises a physical spacing between each cable grouping.

7. The energy storage system of claim 6, wherein the physical spacing is a spacing between each cable grouping of between three inches and 8 inches.

8. The energy storage system of claim 1, wherein the selected inductance is determined based at least in part on a short circuit current of the energy storage device.

9. The energy storage system of claim 8, wherein the selected inductance is determined to control a peak short circuit current of the energy storage device during a short circuit event.

10. The energy storage system of claim 1, wherein the magnetic framework comprises at least one steel I-beam structure.

11. The energy storage system of claim 1, wherein the magnetic framework comprises at least one steel C-channel structure.

12. The energy storage system of claim 1, wherein the magnetic framework is configured to manipulate a magnetic field associated with a current flow in the one or more cables based at least in part on the selected inductance.

13. The energy storage system of claim 1, wherein the one or more cables couple the energy storage device to the switching power supply and the switching power supply to the DC bus of the power converter.

14. An energy storage system comprising:
a power converter system having a DC bus;
an energy storage system coupled to the DC bus of the power converter, the energy storage system comprising an energy storage device and a switching power supply coupled between the energy storage device and the DC bus of the power converter;
one or more cables configured to couple the energy storage device to the switching power supply; and
a magnetic framework positioned proximate the one or more cables, the magnetic framework comprising one or more magnetic structures, the magnetic framework spanning at least a portion of the one or more cables;
wherein the one or more cables are positioned in a physical arrangement that, in conjunction with the magnetic framework, facilitates a selected inductance between the cables; and
wherein the one or more cables comprise a positive cable grouping, a negative cable grouping, and a ground cable grouping, and wherein the ground cable grouping is positioned between the positive cable grouping and the negative cable grouping in a substantially parallel manner with respect to the positive cable grouping and the negative cable grouping, and wherein the magnetic framework is positioned such that at least two magnetic structures substantially surround at least one cable grouping.

15. The energy storage system of claim 14, wherein the one or more cables comprise a positive cable grouping and a negative cable grouping, and wherein the physical arrangement of the one or more cables comprises a parallel arrangement, such that the positive cable grouping is positioned in a substantially parallel manner with respect to the negative cable grouping.

16. The energy storage system of claim 1, wherein the energy storage system is part of a renewable energy system.

17. A method of regulating a current associated with an energy storage device, the method comprising:
identifying a selected inductance based at least in part on a short circuit current of an energy storage device associated with an energy storage system;
determining a physical arrangement of one or more cable groupings associated with the energy storage system based at least in part on the selected inductance, wherein the one or more cable groupings comprise a positive cable grouping, a negative cable grouping, and a ground cable grouping;
determining a magnetic framework configuration to be positioned proximate the one or more cable groupings based at least in part on the selected inductance; and
positioning the ground cable grouping between the positive cable grouping and the negative cable grouping in a substantially parallel manner with respect to the positive cable grouping and the negative cable grouping, wherein the magnetic framework is positioned such that at least two magnetic structures substantially surround at least one cable grouping.

18. The method of claim 17, further comprising positioning the one or more cable groupings and the magnetic framework based at least in part on the determined physical arrangement and the determined magnetic framework configuration.

* * * * *